SELF-GRIPPING FASTENING DEVICE

Original Filed Jan. 12, 1968 2 Sheets-Sheet 1

INVENTOR.
GEORGE C. BRUMLIK

BY Edward F. Levy
ATTORNEY

SELF-GRIPPING FASTENING DEVICE

Original Filed Jan. 12, 1968 2 Sheets-Sheet 2

INVENTOR.
GEORGE C. BRUMLIK

BY Edward F. Levy
ATTORNEY

United States Patent Office

Re. 27,725
Reissued Aug. 7, 1973

27,725

SELF-GRIPPING FASTENING DEVICE

George C. Brumlik, 154 Upper Mountain Ave., Montclair, N.J. 07042

Original No. 3,494,006, dated Feb. 10, 1970, Ser. No. 697,527, Jan. 12, 1968. Application for reissue Feb. 8, 1972, Ser. No. 224,630

Int. Cl. A44b *9/00, 19/00*

U.S. Cl. 24—204 6 Claims

Matter enclosed in heavy brackets [ ] appears in the original patent but forms no part of this reissue specification; matter printed in italics indicates the additions made by reissue.

ABSTRACT OF THE DISCLOSURE

A self-gripping fastening device for connecting together a pair of articles, only one of which is required to be provided with the device. The device comprises a plurality of barbed fastening elements, each being secured at one end to one surface of one of the articles to be gripped. When the fastening device is pressed against the opposing surface of the other article to be gripped, the free ends of the fastening elements penetrate and lodge in the other article to thereby effect adhesion between the pair of articles.

The present invention relates to fastening devices and in particular to a novel and improved fastening device which is operative to grip an opposed surface upon contact therewith in a self adhering action.

Various self-gripping fasteners, particularly suitable for releasably fastening fabrics and the like are presently available. Typical of such fasteners is a self-gripping fastener assembly presently marketed under the trademark "Velcro" and which is in the form of pairs of fabric strips which are respectively sewn or otherwise secured to the opposing fabrics to be fastened together. In the "Velcro" fastener, multiple rows of small vertically extending open plastic loops are secured to the outer surface of one of the matching strips, while matching small plastic hooks are secured to the outer surface of the opposite strips. Thus, when the two opposing strips are press-contacted, the hooks in one strip link with the opposing loops so that the opposing strips are interlocked in a gripping action. The opposing strips may be released by pulling them apart with sufficient force to cause the above mentioned hooks to idsengage from their corresponding loops.

While the above described Velcro fastener provides an effective gripping action, the cost of manufacture thereof is relatively expensive. Furthermore, it is apparent that a "Velcro" type grip requires that both of the opposing surfaces have matching Velcro type strips in order to effact an interlocking grip.

The present invention is directed to a fastener device which is relatively inexpensive and simple to manufacture and is advantageous over the "Velcro" type fastener in that only one surface is provided with fastener means.

It is therefore an object of the present invention to provide an economical and simple fastening device operative to grip an opposing penetrable article. It is a further object of the present invention to provide a fastening device which does not require that opposing article be provided with any fastening means.

It is a further object of the present invention to provide an economical method for making a fastening device in accordance with the foregoing objects.

In accordance with principles of the present invention there is provided a self-gripping fastening device for connecting together a pair of articles, and the method for making the same. The device of the present invention comprises a plurality of fastening elements secured to one surface of one of the articles to be gripped. Each of the fastening elements comprise an elongated body and is suitably secured at one end thereof to said one article surface an dextends substantially perpendicularly therefrom. Each of the elongated bodies has at least one wedge-shaped barb extending from the elongated body at its free end, and oriented in the general direction of the longitudinal axis of the elongated body. Accordingly, when the fastening device of the present invention is pressed against the other article, the elongated bodies at their respective free ends penetrate and lodge in the other article to thereby effect adhesion between the pair of articles.

Additional objects and advantages of the invention will become apparent during the course of the following specification when taken in connection with the accompanying drawings in which.

Figure 1:
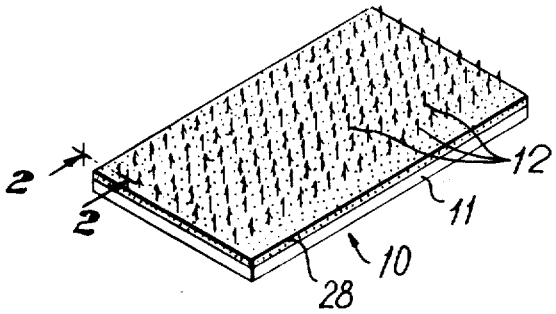
FIG. 1 is a perspective view of a fastening device constructed in accordance with the present invention, as comprising a plurality of fastening elements secured to a supporting sheet of material.

Referring in detail to the drawings, there is shown in FIG. 1, an article 10 to which has been applied fastening means in accordance with the present invention. The article 10 may, by way of example, have a flat sheet-like body 11 as illustrated, and is intended to be secured to an opposing penetrable surface. For this purpose, the article 10 has a plurality of upstanding barbed fastening elements 12 secured to one surface thereof in a manner to be presently described.

To fasten article 10 to an opposing surface, it is pressed against the opposing surface with sufficient force to cause the fastening elements 12 to penetrate the opposing material and lodge therein. Article 10 will thus be firmly interlocked with the opposing material by the combined gripping action of the large number of fastening elements 12 embedded and locked in the opposing material. The size, number and distribution density of fastening elements 12 on sheet 10 will be determined by the size and nature of the opposing material to be gripped, as described hereinafter in greater detail.

Figure 2:
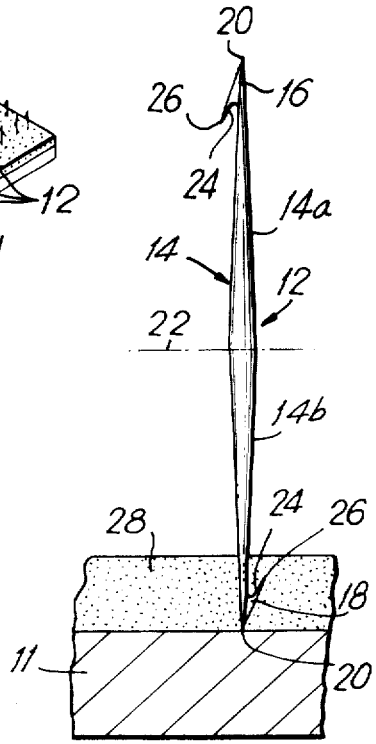
FIG. 2 is an elevational view on an enlarged scale of a single fastening element in one embodiment of the present invention, shown secured to a portion of a supporting sheet of material, shown in cross-section as taken along the line 2—2 of FIG. 1.

FIG. 2 shows one of the fastening elements 12 in detail and on an enlarged scale, and also illustrates the manner in which the fastening element is mounted on the article 12. The fastening element 12 constitutes a bilaterally-symmetrical member having an elongated stem 14 terminating at its ends in sharp barbs 16 and 18. The stem 14 is formed of integral half portions 14a and and 14b, in the shape of oppositely-disposed cones of equal size, whereby element 12 is widest and has its lateral axis 22 at the midpoint of stem 14. Each half portion 14a and 14b tapers from the axis 22 to its tip, forming a sharp point 20 at said tip and at its juncture with the respective barb 16 or 18.

The [barms] *barbs* 16 and 18 are identical, each being wedge-shaped and having an edge 24 inclined outwardly from the pointed tip 20 to a sharp pointed free end 26.

In the preferred form of the fastening assembly, the fastening elements 12 are of uniform size and are made small for mounting in closely-shaped random arrangement on the surface of an object, in the manner shown in FIG. 1. Typically, the fastening elements 12, as well as the alternate embodiments illustrated in FIGS. 3–7, have an overall length ranging from one-twentieth to one-half inch, and a diameter at the lateral axis 22 ranging from approximately one-thousandth to fifty thousandths of an inch. The fastening elements may, for example, be made of plastic such as styrene, nylon, polyvinyl resin, or the like, and formed in the shapes shown by micro-molding, or by extruding the plastic in the form of a profiled sheet which is cut up with the elements, in a manner which will be presently explained. The elements may also be made of metal in a die casting operation, or may be made of bent wire.

In order to provide an article surface with a fastening assembly capable of gripping an opposing material, a large number of fastening elements, for example the elements 12 of FIG. 2, are required to be secured to the article 10 in the manner shown in FIG. 1. This may be accomplished by coating the body 11 of article 10 with a layer of adhesive 28, and while layer 28 is still tacky projecting the fastening elements 12 in a direction perpendicular thereto, such as by means of a jet of air.

The fastening elements 12 are projected in this manner with sufficient force to cause lower stem portion 14b to penetrate adhesive layer 28 to a sufficient depth, preferably completely, as shown in FIG. 2, so that layer 28 will provide sufficient lateral support thereto, to maintain fastening elements 12 in a position substantially perpendicular to the upper surface of the article body 11. Adhesive layer 28 should have a sufficiently thick consistency in its tacky condition in order to support fastening elements 12 in the perpendicular position at which they reach the article body 11. When adhesive layer 28 hardens, it will provide sufficient lateral support to the embedded portion of each stem 14 in its perpendicular position. The receding edge 24 of each barb embedded in layer 28 secures fastening element 12 in the longitudinal direction to prevent extraction thereof from layer 28 once the latter has hardened.

It will be appreciated that if body 11 of article 10 constitutes a plastic material, its upper surface may be heated or otherwise treated to render it tacky, in which case the necessity for a separate layer of adhesive will be obviated, but the same result achieved.

Because fastening elements 12 are symmetrical about their lateral axis 22, they may be projected into layer 28 with either stem portion 14a or 14b leading. As a result, the above-mentioned flocking operation i.e. deposition of fastening elements, is greatly simplified since fastening elements 12 may thus be randomly loaded into a blowing machine and propelled by means of a jet of air into layer 28.

With a large number of fastening elements 12 secured in relatively thick profusion to the object 10 and projecting in upstanding condition from the surface thereof, as shown in FIG. 1, the fastening assembly is capable of gripping an opposed article or material which is sufficiently soft or penetrable to be pierced by the individual fastening elements. The opposed material may be made of leather, fabric, plastic, or the like. The article 10 may be secured to the surface of said opposed article by pressing it thereagainst with sufficient pressure to cause the exposed portions of the fastening elements 12 to penetrate the material to a depth dependent upon the particular material involved or the spacing desired. When such pressure is exerted on the article 10, the sharply-pointed leading tip 20 of each fastening element 12 will pierce the opposed surface, and the wedge shape of the contiguous barb 16 enables the barb to easily penetrate through the surface to the desired depth in the material.

When the article 10 is applied to an opposed material, as above described, the inserted barbs provide a considerable resistance to disengagement. Thus, when force is applied in the opposite direction, the pointed free end 26 of each barb 16 pierces the material of the attached opposed article, acting as a hook to restrain movement of the barb out of said attached article. For a given penetrable material, the resistance to disengagement therefrom will clearly be determined by the thickness and rigidity of the barbs which are engaged by the penetrable material, and by the number of barbs so engaged. With the barbs formed in the wedge shapes illustrated in FIG. 1 as well as in FIGS. 2–7, the adhesion [proved] *provided* thereby is relatively permanent, that is to say, the barbs will resist withdrawal of the fastening elements from the attached material unless sufficient force is applied thereto to cause tearing or other damage to the attached material. This is in contrast to the form of fastening element illustrated in FIGS. 9–12 which provides a temporary adhesion, as will be presently explained.

Figure 3:
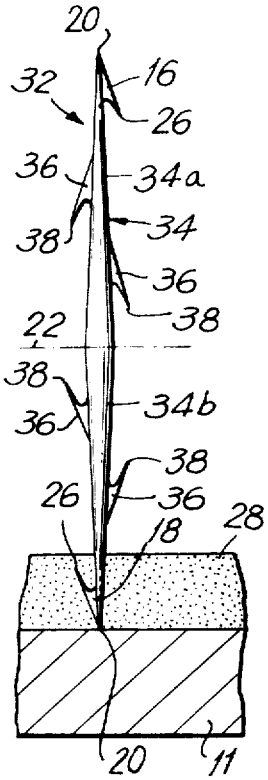
FIG. 3 is an elevational view, similar to FIG. 2, of a single fastening element in a second embodiment of the present invention, shown secured to a portion of a supporting sheet of material in a manner similar to that of FIG. 2.

FIG. 3 illustrates a modified form of fastening element 32 which is identical to the element 12 shown in FIG. 2, except that in addition to the terminal barbs 16 and 18, a plurality of barbs 36 are provided in spaced, staggered arrangement along the intermediate portion of the stem 34. Again, the stem 34 is formed of half portions 34a and 34b in the shape of opposing cones of equal size, so that element 32 is widest and has its lateral axis 22 at the midpoint of stem 34. The intermediate barbs 36 may be longitudinally aligned with the terminal barbs 16 and 18, or may be staggered circumferentially around the stem 34. In either event, the barbs 36 are symmetrically arranged on the respective stem half portions 34a and 34b with the barbs 16 and 36 on the portion 34a facing in one direction and the barbs 18 and 36 on the portions 34b facing in the opposite direction.

The fastening elements 32 are mounted on the article 10 in the same manner as the elements 12 previously described, that is by projecting them upon the adhesive layer 28 coating the article body 11, or upon a tacky surface thereon, in such a manner that the elements 32 strike the article 10 in a perpendicular direction. Again, since the elements 32 are symmetrical, they may be projected with either stem portion 34a or 34b leading.

The intermediate barbs 36, like the terminal barbs 16, 18 are wedge-shaped, having sharply-pointed tips 38. The presence of these intermediate barbs 36 provides a greater gripping action when the article 10, covered with an array of fastening elements 32, is pressed against an opposed penetrable surface, and increases the resistance to disengagement.

Figure 4:
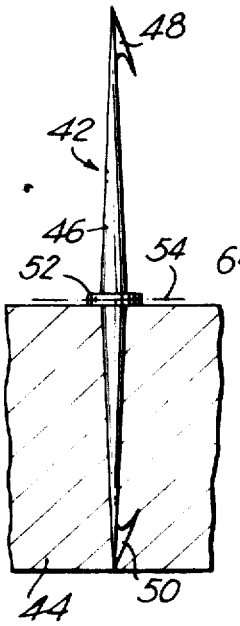
FIG. 4 is an elevational view of a single fastening element constituting another embodiment of the present invention, the element being shown secured to a portion of a supporting sheet of material by having a portion thereof embedded therein.

FIG. 4 shows another embodiment of a fastening element 42 made in accordance with the present invention and designed to penetrate the supporting sheet material 44, thus eliminating the need for a supporting adhesive layer as in the embodiments of FIGS. 2 and 3. Fastening element 42 of FIG. 4 is structurally similar to element 12 of FIG. 2, having a similar shape for its stem 46 and arrangement of terminal barbs 48 and 50, except that fastening element 42 is additionally provided with a disc-shaped stop member 52 located at its lateral axis 54. Disc 52 is operative to limit the penetration of stem 46 into sheet 44 when fastening element 42 is injected therein. Thus, disc 52 comes to rest in engagement with the upper surface 56 of support sheet 44, with the stem 46 perpendicular to said surface. As with the embodiments previously described, since fastening element 42 is symmetrical abouts its lateral axis 54, a supply of said fastening elements may be randomly loaded in a blower machine and propelled toward sheet 44 with either end leading. Fastening elements 42 typically have similar dimensions and may be made of the same materials as elements 12 and 32 of FIGS. 2 and 3.

Figure 5:
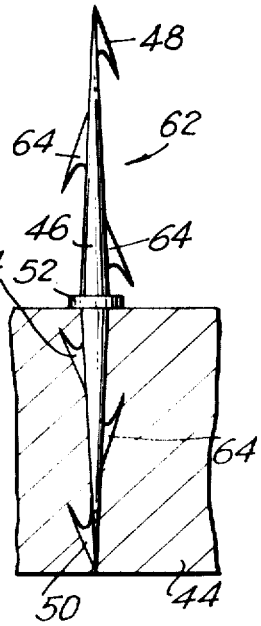
FIG. 5 is an elevational view of another embodiment of a fastening element, shown secured to a portion of its supporting sheet of material in a manner similar to that of FIG. 4.

FIG. 5 illustrates a fastening element 62 which is identical in structure to the element 42 of FIG. 4, except that it is provided with multiple intermediate barbs 64, in the same manner as the element 34 of FIG. 3, for greater gripping action. The fastening element 62 is again adapted to be propelled toward the penetrable supporting sheet material 44 and penetrate the same, as previously described, until the stop disc 52 engages the surface of the material. In this instance, a plurality of intermediate barbs 64 as well as the terminal barb 50 become embedded in the supporting material 44, as illustrated in FIG. 5, to anchor the fastening element 62 firmly in mounted position. The intermediate barbs 64 on the exposed, outwardly-projecting portion of the stem 46 provide a stronger gripping action upon the material to which the assembly is subsequently fastened.

Figure 6:
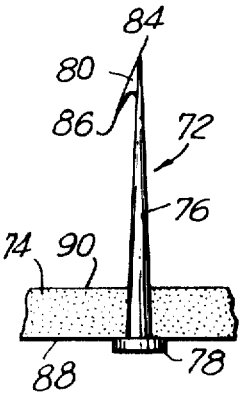
FIG. 6 is an elevational view of a modified form of fastening element shown secured to a portion of its supporting sheet of material by being injected into the supporting sheet from its rear surface.
Figure 7:
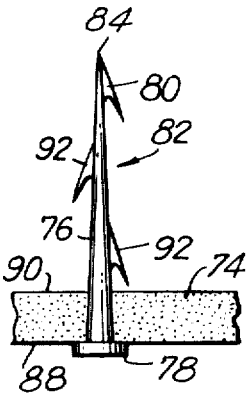
FIG. 7 is an elevational view of still another embodiment of fastening element shown secured to a portion of its supporting sheet of material in a manner similar to that of FIG. 6.

FIGS. 6 and 7 illustrate respective fastening elements 72 and 82 constituting embodiments of another type of fastening element made in accordance with the present invention and designed to completely penetrate a support sheet 74. The element 72 comprises a stem 76 having the shape of a single cone, the base of said stem terminating in an integral disc-shaped stop member 78. At its opposite, narrow end portion, the stem 76 terminates in a wedge-shaped barb 80 having a sharply-pointed leading tip 84 and a sharply pointed hook 86. In practice, the fastening elements 72 are propelled toward the rear surface 88 of the supporting sheet 74 with sufficient force that the pointed tip 84 of barb 80 pierces the sheet 74 and the shank 76 penetrates entirely through the sheet until the disc 78 engages the rear surface 88 to stop further penetration. The forward portion of stem 76 projects perpendicularly from the front surface 90 of the sheet 74, as shown in FIG. 6, with the barb 80 exposed for engagement with an opposed body.

The fastening element 82, shown in FIG. 7, is identical to the element 72 except that it is provided with additional intermediate barbs 92 which provide greater gripping action as previously described in connection with the elements 32 and 62 of FIGS. 3 and 5 respectively. The element 82 is mounted in the same manner as the element 72 of FIG. 7, by projecting it at the rear surface 88 of support sheet 74 so that it pierces the latter until stopped by disc 78.

FIGS. 8–13 illustrate another manner in which the elements may be formed so that the hooks thereon are initially in a closed, non-gripping position for flocking or similar application to the carrier article, and thereafter, the exposed hooks may be treated to cause them to open up into a gripping position. As in the previously described embodiments, the hooks are formed upon the fastening elements in opposed symmetrical arrangement, with the hooks on each half facing the central transverse axis of the element, such that the elements may be flocked or blown upon the carrier with either end facing the carrier.

In this instance, the fastening elements are formed of plastic, particularly a plastic which may be extruded in prestressed form and in which the stressed portions are relieved and open up when subjected to heat or chemical treatment. Such plastics may be nylon, polyacetal, polycarbonate, polysulfone and the like.

Figure 8:
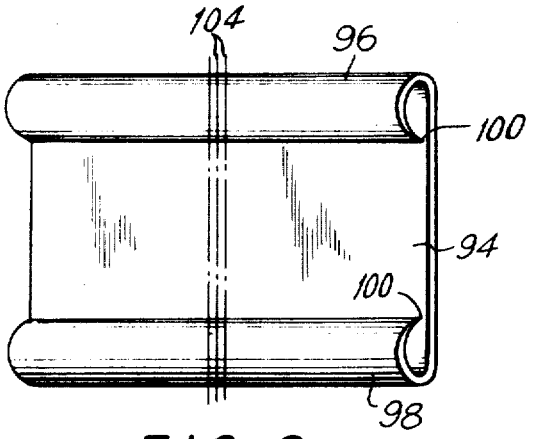
FIG. 8 is a perspective view of a sheet of extruded plastic formed with a suitable profile for forming a plurality of fastening elements of a releasable fastener type.

FIG. 8 illustrates a sheet of plastic 94 which is extruded in the profile shown with end flutes 96 and 98, each having a sharp edge 100. The fastening elements are formed by chopping or cutting through the profile in very thin sections as indicated by the cut lines 104. The resulting fastening elements exemplified by the element 102 shown in FIG. 9 is thus provided with the profile of the extruded sheet 94, and preferably has a width approximately equal to its thickness.

The fastening element 102 again constitutes a bilaterally-symmetrical member having an elongated stem 106 terminating at its ends in curved barbs or hooks 108 and 110. Each hook 108 and 110 has a sharp end 112 and the hooks are oppositely arranged so that each sharp end 112 is directed inwardly toward the central axis 114 of the element 102. Because of the extrusion formation of the elements, the hooks 108 and 110 are bent inwardly toward the stem 106 with the sharp ends 112 located close to said stem. The hooks are thus essentially closed and their sharp ends unexposed. Consequently, when the elements are randomly loaded into a hopper or the like for flocking, the hooks will not grip each other and thus tangling is prevented.

Figure 10:
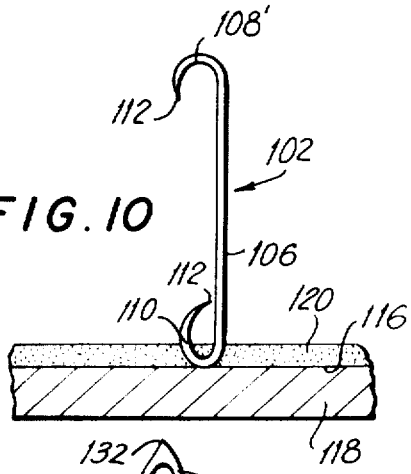
FIG. 10 is an elevational view of the fastening element of FIG. 9 shown mounted on a support sheet, with its outer hook treated to cause it to expand and open.

In order to cover a surface with a plurality of fastening elements 102, the surface 116 of a sheet or article 118 is coated with a layer of adhesive 120, and while the layer is still tacky, the fastening elements 102 are projected thereon in a perpendicular direction, as by means of an air jet. Either one of the hooks, for example, the lower hook 110 thus becomes embedded in the adhesive layer 120, and when the latter hardens, the element 102 is securely mounted upstanding on the article 118, as shown in FIG. 10.

Figure 9:
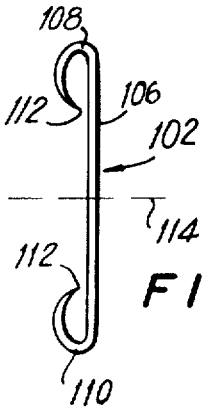
FIG. 9 is an elevational view, on an enlarged scale, of a releasable type of fastening element formed from the extruded sheet shown in FIG. 8.

Immediately after mounting, the exposed upper hook 108 is still in the closed, non-gripping condition indicated in FIG. 9. The outer ends of all of the mounted elements 102 are then heat treated or chemically treated, causing the prestressed closed hooks 108 to unbend and open up to the position shown as 108' in FIG. 10 wherein the sharp end 112 is exposed for gripping action. It will be understood that the fastening elements 102, in the form illustrated, would be made of very small, almost filament-like thickness, so that the opened hook 108' would be relatively flexible. Consequently, when fastening assembly formed of a plurality of fastening elements 102 is secured to the surface of an opposed article by pressing the elements thereagainst, the exposed hook 108' will flex inwardly sufficiently to form an effective pointed end which will penetrate the surface of the opposed article, and after such insertion will again unbend and expand to the position shown in FIG. 10, wherein the sharp end 112 will grip the opposed surface.

The fastening elements 102 are constructed to provide only a temporary adhesion so that they may be readily removed from the opposed article. This is again a result of the fact that the elements are made sufficiently thin and have sufficient flexibility to permit their yielding out of gripping engagement with the attached material when this material and the article 118 are pulled apart. This flexible yielding will permit the fastening elements to be withdrawn from the attached material without damage to the latter.

Figure 11:
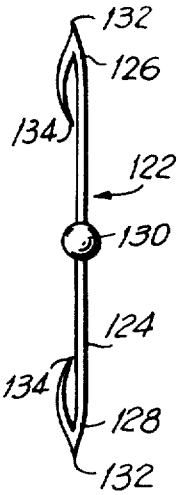
FIG. 11 is an elevational view of a modified form of releasable fastening element.
Figure 12:
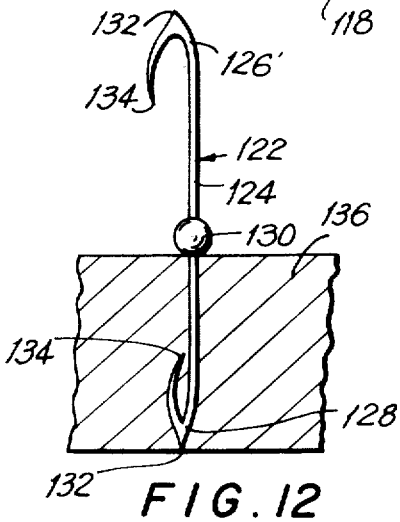
FIG. 12 is an elevated view of the fastening element of FIG. 11 shown mounted on a support sheet with its outer hook treated to cause it to expand and open.

FIGS. 11 and 12 illustrate another form of fastening element 122 which is also constructed to provide a temporary adhesion. The element 122 includes an elongated stem 124 terminating at its ends in hooks 126 and 128. At its center, the stem 124 is formed with an integral projecting stop member 130. The fastening elements 122 are preferably formed in the same manner previously described in connection with FIG. 8, namely by extruding a sheet having the cross-sectional profile of the element, and then chopping this sheet into a plurality of narrow fastening elements 122.

The hooks 126 and 128 are identical and again face in opposite directions. In this instance, the hooks 126 and 128 are made in the angular form shown in FIG. 11 to provide respective pointed outer tips 132. FIG. 11 illustrates the prestressed form of the hooks 126 and 128 which results from extruding the sheet plastic in this profile and which form is maintained after cutting. The arms of each hook 126 and 128 are arranged at a very acute angle, and the pointed end 134 of each hook is curved inwardly toward the shank 124 so that the sharp tip is not exposed and the fastening elements may be randomly arranged in a pile without tangling.

Because of the sharply pointed outer tips 132 of the hooks 126 and 128, the fastening elements 122 may be mounted on fabric or other penetrable material by blowing them perpendicularly against the surface thereof with either hook leading and with sufficient force to cause the leading hook to penetrate the material. FIG. 12 shows an element 122 so mounted on material 136, the hook 128 having pierced the material 136 and the shank 124 having penetrated therein until stopped by engagement of stop member 130 with the material surface, the exposed hook 126 is then heat treated or chemically treated as previously described, causing the hook 126 to unbend and open up as indicated at 126' in FIG. 12, its sharp end 134 being exposed for gripping an opposed article to be fastened thereto. In its unbent condition shown in FIG. 12, the hook 126' maintains its pointed outer tip 132 which will penetrate the opposed article when fastening thereto is desired.

Figure 13:
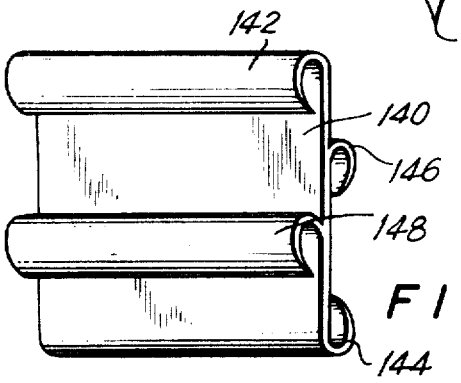
FIG. 13 is a perspective view of another form of extruded plastic which may be used to form fastening elements having intermediate hook members.

It will be understood that the extruded fastening elements shown in FIGS. 9–12 may be provided with intermediate hooks or barbs, if desired in the same manner as the elements shown in FIGS. 3, 5 and 7. These intermediate hooks may be provided in the element stems simply by forming them in the profile of the sheet extrusion. FIG. 13, for example, illustrates an extruded plastic sheet 140 similar to that shown in FIG. 8 except that in addition to the end flutes 142, 144, intermediate flutes 146 and 148 are also provided to result in intermediate hooks on the fastening elements formed by cutting up the sheet 140. The intermediate flutes and resulting intermediate hooks are pre-stressed in the same manner as the outer hooks and may be treated after mounting of the elements to relieve the stress and cause them to open up.

It is appreciated that the fastening means, in the various embodiments thereof, as described above, have broad application where slide fasteners, snap fasteners, "Velcro" type fasteners and the like, have been used heretofore. Thus, a strip or sheet having the fastening assembly mounted thereon may be suitably secured to one surface of a pair of surfaces to be gripped together, and the two surfaces pressed together to form a secure interlocking engagement. Alternatively, the fastening elements themselves may be applied directly to one of the opposing surfaces to be gripped, in the manner described above. In this event, which of the various fastening elements 12, 32, 42, 62, 72 or 82 are to be used, and the corresponding method of application thereof, will be determined by the nature and thickness of the supporting sheet or body involved.

A particular advantage of each of the fastening arrangements of the present invention described above, is that only one of the opposing surfaces to be gripped together is required to be provided with the fastening elements of the present invention. This feature endows the fastening means of the present invention with an important advantage over the "Velcro" type matching fastening means, where one of the opposing surfaces to be gripped carries loop elements and the other carries matching hook elements. Furthermore, the method of the present invention of applying the fastening elements to the supporting sheet material, as described above, is deemed to be much simpler and more economical than the method of applying "Velcro" fastening elements to its supporting sheet material.

What is claimed is:

1. A self-gripping fastening member having an adhesive face capable of being attached to a second member having a penetrable face by pressing said faces together, the adhesive face of said fastening member comprising an exposed surface and a plurality of self-gripping fastening elements individually mounted thereon in [random] spatial arrangement, each of said fastening elements comprising a thin, flexible filament having an elongated body secured at one end thereof to said surface and extending substantially perpendicularly therefrom, each of said elongated bodies having at least one barb extending therefrom at its free end, each of said barbs being hook-shaped and having a pointed end directed toward said surface, whereby when said adhesive face is pressed against the penetrable face of said second member, said elongated bodies at their free ends penetrate and lodge in said penetrable surface to thereby effect adhesion between said pair of members.

2. A self-gripping fastening member according to claim 1 in which the elongated body of each filament terminates at a sharp point and in which said barb is wedge shaped, extending from said sharp point toward the mounted end of said body.

3. A self-gripping fastening member according to claim 1 in which each of said elongated bodies is in the form of oppositely oriented cone portions having a common base at approximately the midpoint of the length of said elongated body, and in which said barbs are disposed on each of said cone portions oriented in the direction of the respective apexes of said cone portions respectively, said barbs being disposed on said cone shaped portions in equal numbers thereon.

4. A self-gripping fastening member according to claim 3 in which each fastening element includes a protruding stop disposed at said common base for limiting penetration of either end of said elongated body into the penetratable face of said second member.

5. a self-gripping fastening member according to claim 1 in which the barbs on said fastening elements are in the form of pre-stressed, tightly curled hooks terminating in pointed ends directed inwardly toward the elongated filament body of said fastening element, said barbs being formed of such material as to be capable of opening under suitable treatment to expose the pointed end thereof.

*6. A salf-gripping fastening member according to claim 1 in which said fastening elements are individually mounted on said surface in random special arrangement.*

References Cited

The following references, cited by the Examiner, are of record in the patented file of this patent or the original patent.

UNITED STATES PATENTS

| | | | |
|---|---|---|---|
| 920,808 | 5/1909 | Alcott | 85—21 |
| 1,225,555 | 5/1917 | Achtmeyer | 85—13 |
| 2,238,946 | 4/1941 | Roberts | 16—16 |
| 2,250,669 | 7/1941 | Jamgotchian | 16—8 |
| 2,284,301 | 5/1942 | Rieser | 85—11 |

| | | | |
|---|---|---|---|
| 3,031,730 | 5/1962 | Morin | 24—204 |
| 3,128,514 | 4/1964 | Parker et al. | 24—204 |
| 3,147,528 | 9/1964 | Erb | 24—204 |
| 3,266,113 | 8/1966 | Flanagan | 24—204 |
| 3,365,757 | 1/1968 | Billarant | 24—204 |
| 2,631,327 | 3/1953 | Roberts | 16—16 |

FOREIGN PATENTS

| | | |
|---|---|---|
| 529,293 | 6/1954 | Belgium. |
| 439,105 | 3/1912 | France. |
| 892,038 | 1/1944 | France. |
| 21,114 | 2/1883 | Germany. |
| 306,833 | 4/1933 | Italy. |
| 650,351 | 12/1962 | Italy. |

BERNARD A. GELAK, Primary Examiner

U.S. Cl. X.R.

24—87; 85—13, 14, 21